United States Patent
Rudniski

(10) Patent No.: US 7,508,160 B1
(45) Date of Patent: Mar. 24, 2009

(54) SOFT START SYSTEM FOR MOTORS UTILIZING VARIABLE FREQUENCY DRIVE AND AUTOTRANSFORMER

(75) Inventor: David Rudniski, Toronto (CA)

(73) Assignee: Converteam Inc., Pittsburgh, PA (US)

( * ) Notice: Subject to any disclaimer, the term of this patent is extended or adjusted under 35 U.S.C. 154(b) by 33 days.

(21) Appl. No.: 11/566,642

(22) Filed: Dec. 4, 2006

(51) Int. Cl.
*H02P 27/04* (2006.01)

(52) U.S. Cl. .................... 318/801; 318/803; 318/807

(58) Field of Classification Search ............... 318/801, 318/803, 807, 607
See application file for complete search history.

(56) References Cited

U.S. PATENT DOCUMENTS

| | | | | |
|---|---|---|---|---|
| 3,786,335 A | * | 1/1974 | Phillips et al. | 363/160 |
| 4,388,579 A | * | 6/1983 | Ellis | 318/732 |
| 4,935,686 A | * | 6/1990 | Stacey | 318/801 |
| 5,013,929 A | * | 5/1991 | Dhyanchand | 290/31 |
| 2007/0164701 A1 | * | 7/2007 | Wu | 318/801 |

* cited by examiner

*Primary Examiner*—Bentsu Ro
*Assistant Examiner*—Thai Dinh
(74) *Attorney, Agent, or Firm*—Egbert Law Offices PLLC

(57) ABSTRACT

A soft start system for starting large motors has a power supply suitable for passing power to the motor, a variable frequency drive connected to the power supply and an autotransformer connected between the variable frequency drive and the motor for passing power of an elevated current to the motor. A switch is connected between the motor and power supply for connecting the motor to the power supply when the motor reaches a desired speed. The autotransformer includes a single core with a winding extending over the single core. The autotransformer includes a first terminal connected the variable frequency drive, a second terminal connected the motor and a grounded neutral.

17 Claims, 5 Drawing Sheets

SOFT START SYSTEM FOR MOTORS UTILIZING VARIABLE FREQUENCY DRIVE AND AUTOTRANSFORMER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to systems for starting motors. More particular, the present invention relates to a soft start system for reducing the power requirements of the motor during the starting of the motor. Additionally, the present invention relates to soft start systems which utilize variable frequency drives.

2. Description of Related Art Including Information Disclosed Under 37 CFR 1.97 and 37 CFR 1.98

Variable frequency drives (often abbreviated "VFD") are systems for controlling the rotational speed of an alternating current (AC) electric motor by controlling the frequency of the electrical power supply to the motor. A variable frequency drive is a specific type of adjustable speed drive. Variable frequency drives are also known as adjustable frequency drives, variable speed drives, AC drives or inverter drives. A variable frequency drive system generally includes an AC motor, a controller and an operator interface. The motor used in a VFD system is usually a three-phase induction motor or a synchronous motor. The variable frequency drive controller is a solid state electronic power conversion device. The usual design first converts AC input power to DC intermediate power using a rectifier bridge. The DC intermediate power is then converted to quasi-sinusoidal AC power by using an inverter switching circuit. The rectifier is usually a three-phase diode bridge, but controlled rectifier circuits are also used. Currently, insulated gate bipolar transistors (IGBTs) are used on most VFD inverter circuits.

AC motor characteristics require the applied voltage to be proportionally adjusted whenever the frequency is changed. For example, if a motor is designed to operate at 460 volts at 60 Hz the applied voltages must be reduced to 230 volts when the frequency is reduced to 30 Hz. Thus, the ratio of volts per Hz must be regulated to a constant value. One method used for adjusting the motor voltage is called pulse width modulation (PWM). With PWM voltage control, the inverter switches are used to divide the quasi-sinusoidal output waveform into a series of narrow voltage pulses. The inverter switches to modulate the width of the pulses. An embedded microprocessor governs the overall operation of the VFD controller.

The operator interface provides a means for an operator to start and stop the motor and adjust the operating speed. Additional operator control functions include reversing and switching between manual speed adjustment and automatic control from an external process control signal. The operator interface often includes an alphanumeric display and/or indication lights and meters to provide information about the operation of the drive. An operator interface keypad and display unit is often provided on the front of the VFD controller.

When a VFD starts a motor, it initially applies low frequency and voltage to the motor. The starting frequency is typically 2 HZ or less. Starting at such a low frequency avoids the high inrush current that occurs when the motor is started by simply applying a utility voltage by turning on a switch. When a VFD starts, the applied frequency and voltage are increased at a controlled rate or ramped up to accelerate the load without drawing excessive current. This starting method typically allows a motor to develop 150% of its rated torque while drawing only 150% of its rated current. When a motor is simply switched on at a full voltage, it initially draws at least 500% of its rated current at a very low PF while producing less than 150% of its rated torque. As the load accelerates, the available torque usually drops a little and then rises to a peak while the current remains very high until the motor approaches full speed. A VFD can be adjusted to produce a steady 150% starting torque from standstill right up to full speed while drawing only 150% current. For a pulse width modulated VFD, the input current is not directly related to the output/motor current but only to the total power used by the system. In this case of starting from low speed (say initially 2%), even though the motor current may be 150%, the current draw is ~150%*2%=3%. The current draw then increases as speed increases directly with the total mechanical power+ (motor+VFD) losses. At a running load torque of 50% the maximum current draw is ~50%.

Variable frequency drives are available with voltage and current rating to match the majority of three phase motors that are manufactured for operation from utility power. VFD controllers designed to operate at 110 volts to 690 volts are often classified as low voltage units. Medium voltage VFD controllers are designed to operate at 3300/6000/6600 volts (50 Hz) or up to 13.8 kV. In some applications, a step up transformer is placed between a low voltage and a medium voltage load.

In the transmission and/or distribution of electric power, it is normal practice to interconnect two or more power transformers in order to conveniently and efficiently deliver electric power. Power transformers used in interconnect systems are normally of the three-phase type. An autotransformer is often used to step-up or step-down voltage. The autotransformer consists of one or more windings wound on a core. A typical single phase autotransformer includes first and second end terminals, or taps, and an intermediate tap at which the voltage output is developed.

In many applications, it is desired to provide motors at remote locations. In these remote locations, the utility power supply may be generally inadequate to supply the needs of a motor. If a very large motor is connected to an ineffective utility power supply, then brownouts or damage to the power grid can occur. This is particularly true during the starting of the motor when the power requirements for starting torque are extreme. In order to start such motors, it is often necessary to draw an extreme amount of current to achieve the necessary breakaway torque.

In pipeline operations, very large compressor motors are utilized. Typically, the pipelines extend through very remote areas. These compressor motors must be powered from the utility power supply or from an attached generator. If a generator is utilized, then it must be oversized in order to meet the breakaway power requirements of the particular motor. In other circumstances, lengthy connections must be made in order to connect such a remote motor to the nearest available power grid. In either of these circumstances, it becomes exceedingly expensive to install such a compressor motor in these remote locations. These compressor motors will have horsepower requirements of up to ten thousand horsepower.

As stated hereinbefore, variable frequency drives have often been used to control the AC motor. The variable frequency drive is designed to connect to the motor and therefore operate at the nominal voltage of the motor. For cost and reliability purpose, there are occasions where it is desirable to use a transformer to adapt the variable frequency voltage to the motor (i.e. 600 volts to 4 kV). FIG. 1 illustrates such a system. In FIG. 1, it can be seen that the 690 volt variable frequency drive 10 is connected by line 12 across a transformer 14. The transformer 14 is then connected by line 16 to the 3000 horsepower motor 18. This system of the prior art has two major problems. First, the combination of motor cable capacitance and transformer inductance can cause a doubling of peak voltage at the motor terminals. Secondly, at low frequencies, the motor and transformer resistance define the voltage. For a direct motor connection, the voltage is boosted (increased) but the low frequency operation of the transformer 14 is impossible. The result is a restricted low frequency performance, i.e. low breakaway motor torque.

The increasing use of electric motor-driven reciprocating compressors over gas-driven engines because of enviromental and economic considerations has presented pipeline operators with a new set of motor starting challenges at remote sites having weak electrical supplies. FIG. 2 illustrates the motor torque required relative to the motor speed for a typical unloaded compressor. As can be seen in FIG. 2, after breakaway ("stiction"), the torque requirement is very low. The torque will increase with the speed of the motor. At start, nearly 25% of the motor rated torque is required.

The conventional starting method for a medium voltage (2300 volts and 4000 volts) induction motor is to start them across the power line. This typically results in a 600% inrush current while the motor is accelerating. As can be seen in FIG. 3, the breakaway or locked rotor torque for a Nema B (Starting Type F) motor is around 80%.

At remote sites, where compressors are often located, with long power line feeds, the utility will often not permit the use of high current "across-the-line" starters. The usual approach is to use a reduced voltage soft starter. This reduces an inrush current to about 250 to 300%. However, there is a consequential significant decrease in starting torque to around 15%. This applies to both solid-state soft starters and autotransformer starters. FIG. 4 illustrates these requirements. The net result of this reduced starting torque is that the motor will not be able to break the "stiction" and would not be able to accelerate the compressor.

It is an object of the present invention to provide a soft start system that reduces starting inrush current to minimal levels.

It is another object of the present invention to provide a soft start system which provides sufficient breakaway torque to the motor.

It is another object of the present invention to provide a soft start system that is adaptable to the use of multiple motors from a single starter.

It is still another object of the present invention to provide a soft start system that maximizes the number of starts per hour that are available.

It is still another object of the present invention to provide a bumpless transfer to line.

It is a further object of the present invention to provide a soft start system that is significantly less costly than a fully rated variable frequency drive.

These and other objects and advantages of the present invention will become apparent from a reading of the attached specification and appended claims.

BRIEF SUMMARY OF THE INVENTION

The present invention is a soft start system that comprises a motor, a power supply, a variable frequency drive connected to the power supply, and an autotransformer connected between the variable frequency drive and the motor for passing power to the motor. The autotransformer serves to increase the voltage from the variable frequency drive.

In the preferred embodiment of the present invention, the motor is an AC motor. In particular, the motor is a compressor having horsepower of up to ten thousand horsepower. The motor is connected by a first line to the power supply. A switching means is connected to this first line between the motor and the power supply so as to close and establish an electrical connection with the power supply when the motor reaches a desired speed. In particular, this speed is when the frequency of the motor is synchronized to the frequency of the supply. A sensor is cooperative with the motor for sensing the frequency of power to the motor. The switch means is interactive with the sensor so as to close the switch when the frequency matches the first frequency.

In one form of the present invention, the motor can include a first motor and a second motor. The first motor is connected by a second line to the autotransformer. The switch serves to open when the autotransformer passes power to the first motor so as to start the motor. The switching means opens the second line when the first motor reaches the desired frequency. The second motor is connected by a third line to a power supply. The second motor is connected by a fourth line to the autotransformer. The switching means includes a first switch on the third line and a second switch on the fourth line. The second switch closes when the first motor reaches the desired frequency. The first switch closes when the second motor reaches the desired frequency.

In the present invention, the autotransformer includes a single core with a winding extending thereover. The winding is connected to the motor and to the variable frequency drive. A filter is connected in parallel to the winding. The winding will have a grounded neutral. The filter includes a capacitor that is connected in parallel to the motor. The autotransformer has a resistor connected between ground and neutral. This is critical to allow the transformer to saturate, but still pass power to the motor.

A transformer is connected between the power supply and the variable frequency drive. The transformer serves to decrease the voltage of the power supply to the variable frequency drive.

The present invention is also a process for starting a motor from a power supply comprising: (1) passing power from the power supply of a first voltage and a first frequency and a first current to a variable frequency drive; (2) passing the power from the variable frequency drive to an autotransformer; (3) autotransforming the power by the autotransformer such that the powers of a second frequency that is less than the first frequency and a second voltage that is less than the first voltage, and a second current that is higher than the first current; and (4) passing the autotransformed power to the motor so as to start the motor.

The process of the present invention further includes connecting the motor to the power supply when a frequency of the motor matches the first frequency. The motor is disconnected from the autotransformed power after a few cycles with the step of connecting the motor to the power supply. The power from the power supply can be transformed so as to increase the first voltage to the variable frequency drive. The power of the variable frequency drive is filtered so as to impede high frequency harmonics of the power from the variable frequency drive.

The present invention is also a device for connecting a motor to a power supply. This device includes a variable frequency drive and an autotransformer connected to the variable frequency drive. The variable frequency drive has a terminal suitable for connection to the power supply. The autotransformer has a terminal suitable for connecting to the motor. A switch is connected to the autotransformer for disconnecting the motor from the autotransformer when the motor reaches a desired speed. The switch also serves to connect the motor to the power supply when the motor reaches the desired speed.

DETAILED DESCRIPTION OF THE INVENTION

Figure 6:
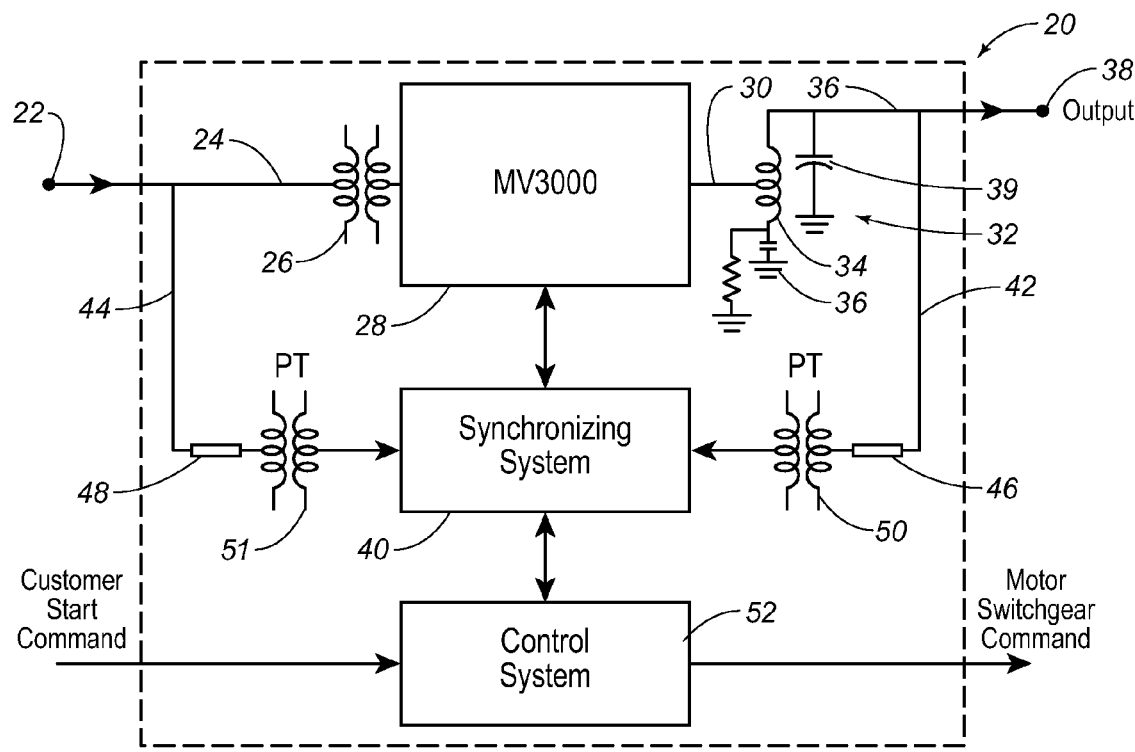
FIG. 6 is a schematic illustration of the soft starter of the present invention.

Referring to FIG. 6, there is shown the soft starter 20 of the present invention. The soft starter 20 is a device suitable for connecting a motor to a power supply. The power supply is connected to terminal 22. Typically, the power supply will be a utility power supply. However, the terminal 22 can also be connected to power supplies provided by a generator. Terminal 22 is connected along line 24 to transformer 26. The transformer 26 is suitable for adapting the voltage from the power supply to a voltage suitable for the variable frequency drive 28. In particular, as used in the present invention, transformer 26 will adapt the voltage from the power supply to approximately 600 volts. The voltage is adapted, for example, in a range from 4 kV to 600V. The variable frequency drive 28 has an output line 30 that is connected to autotransformer 32. Autotransformer 32 includes a winding 34 over a single core. The autotransformer is grounded through a resistor. The neutral is connected to ground 36 via resistor 35 and contactor 33. The tap along the winding 34 can be selected so as to conform with the requirements of the present invention. Importantly, through the use of the autotransformer 32 of the present invention, the current is forced to the motor. This current to the motor is forced by a resistance 35 connected to the winding on one side of the tap or by having a higher voltage at the bottom of the winding. As such, the current is directly forced along line 36 to the output terminal 38 at a frequency greater than 5 Hz bypassed by contactor 33. Output terminal 38 is suitable for connection to the motor. A capacitor 39 is connected in parallel to the winding 34 and to the motor. Capacitor 39 acts as a filter for the pulse width modulated output. As such, it serves to control the quality of the power passing to the motor. The voltage and frequency at the output terminal 38 will be lower than the voltage and frequency of the power supply at the input terminal 22. However, the current at the output terminal 38 will be much greater than the current at the input terminal 22. A synchronization system 40 is connected in parallel to lines 24 and 36. Synchronization system 40 includes a sensor for monitoring the voltage, frequency and current passing through the variable frequency drive 28 and the autotransformer 32. The synchronization system 40 includes a line 42 connected to line 36 associated with output terminal 38. Another line 44 is connected to line 24 associated with the input terminal 22. Respective PT fuses 46 and 48 are provided along lines 42 and 44 and positioned between the connection with the respective lines 36 and 24 and the synchronization system 40. PT's 50 and 51 are also positioned along respective lines 42 and 44. The synchronization system 40 compares the voltages at lines 42 and 44 (via the PT's 50 and 51), in particular, the amplitude, phase, and frequency. The synchronization system 40 is also connected to a controller 52. Controller 52 is part of the customer start command system and the motor switch gear command. As will be described hereinafter, when the motor reaches a desired speed or has a frequency matching the frequency of the power supply, then the synchronization system 40 will signal the controller 52 to switch from the soft starter 20 of the present invention to the utility power supply. Once the motor is at the desired speed, the power requirements can be delivered from the conventional utility system and the soft starter 20 is then disconnected from the motor and can be applied to a secondary motor.

Figure 1:
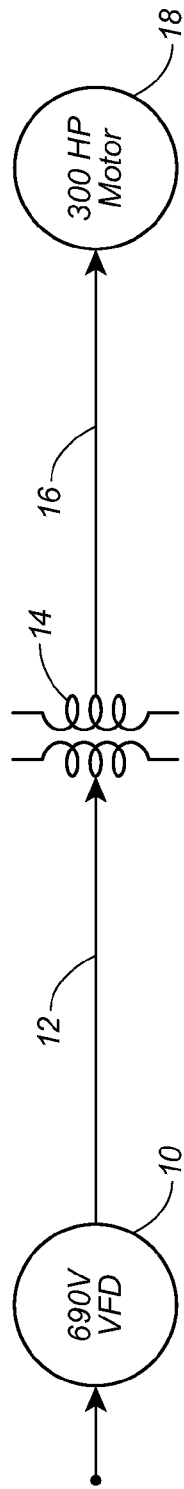
FIG. 1 is a schematic illustration of a prior art system of connecting a transformer to a variable frequency drive.
Figure 2:
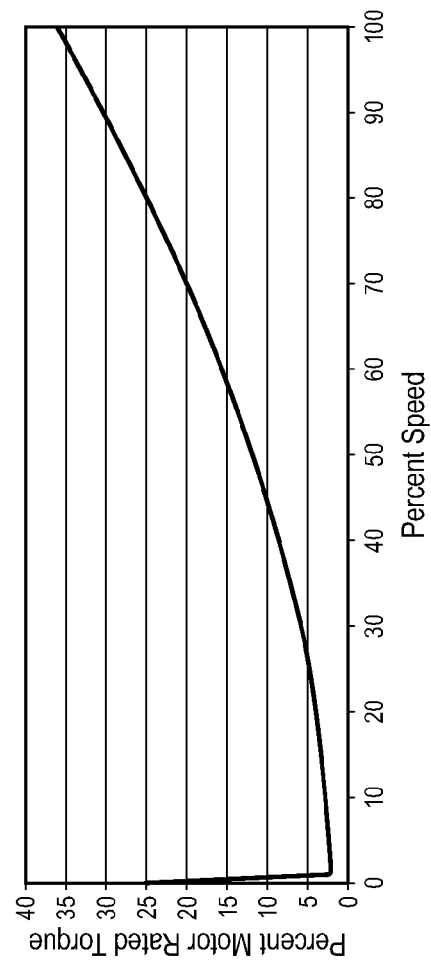
FIG. 2 is a graphical illustration of the motor rated torque relative to the motor speed.
Figure 3:
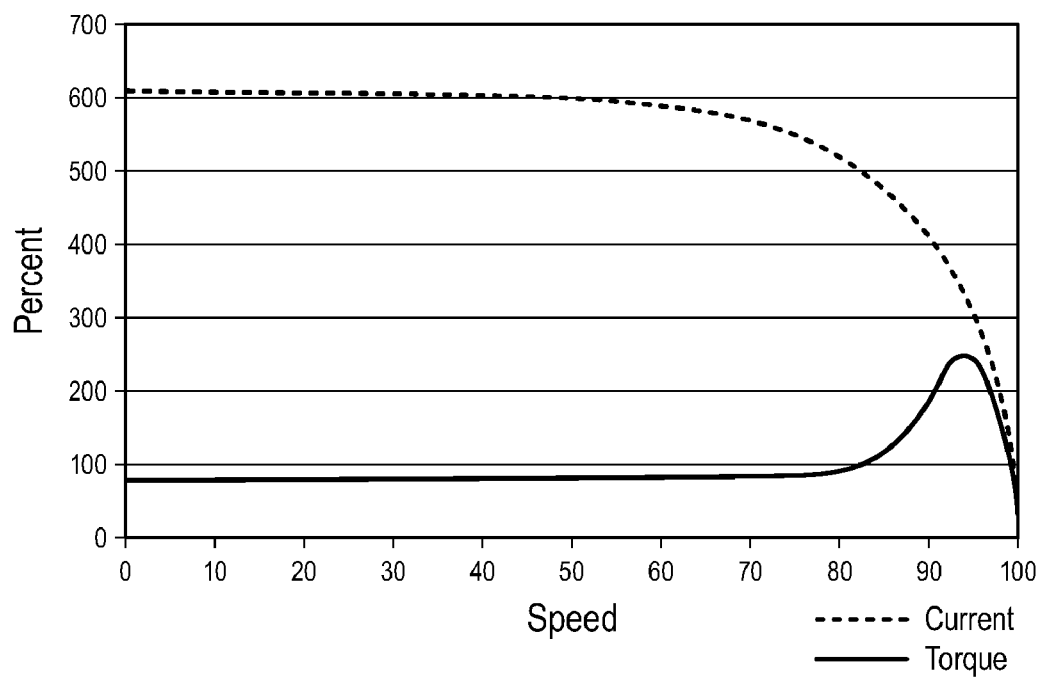
FIG. 3 illustrates the current requirements relative to speed and torque for starting a motor across-the-line of the prior art.
Figure 4:
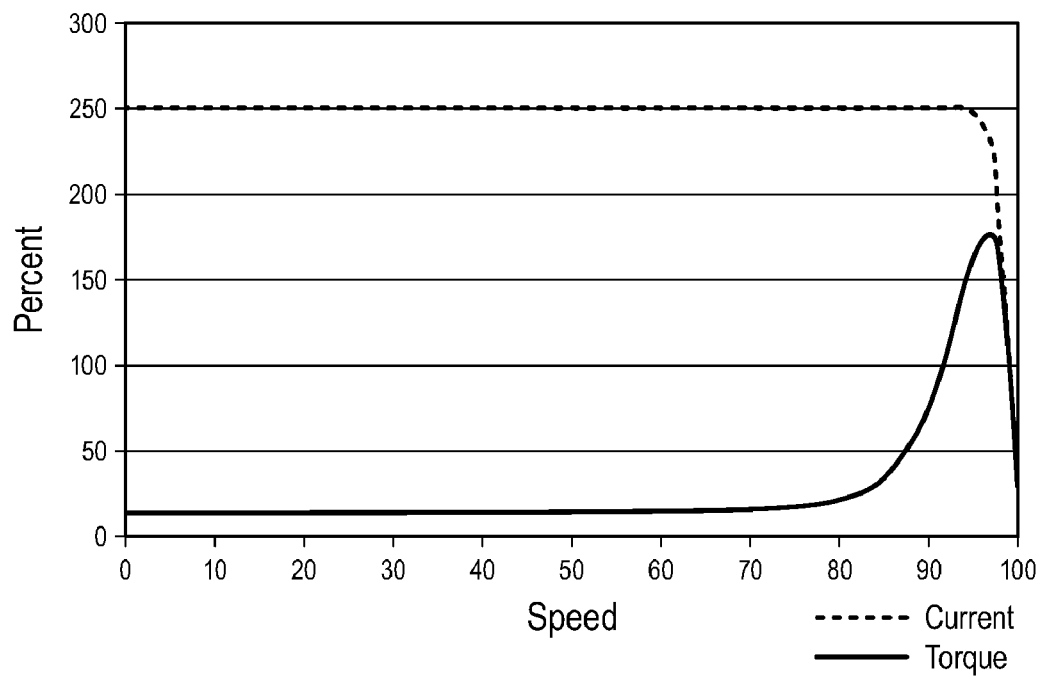
FIG. 4 is a graphical illustration of current requirement relative to torque through the use of solid-state soft starters of the prior art.
Figure 5:
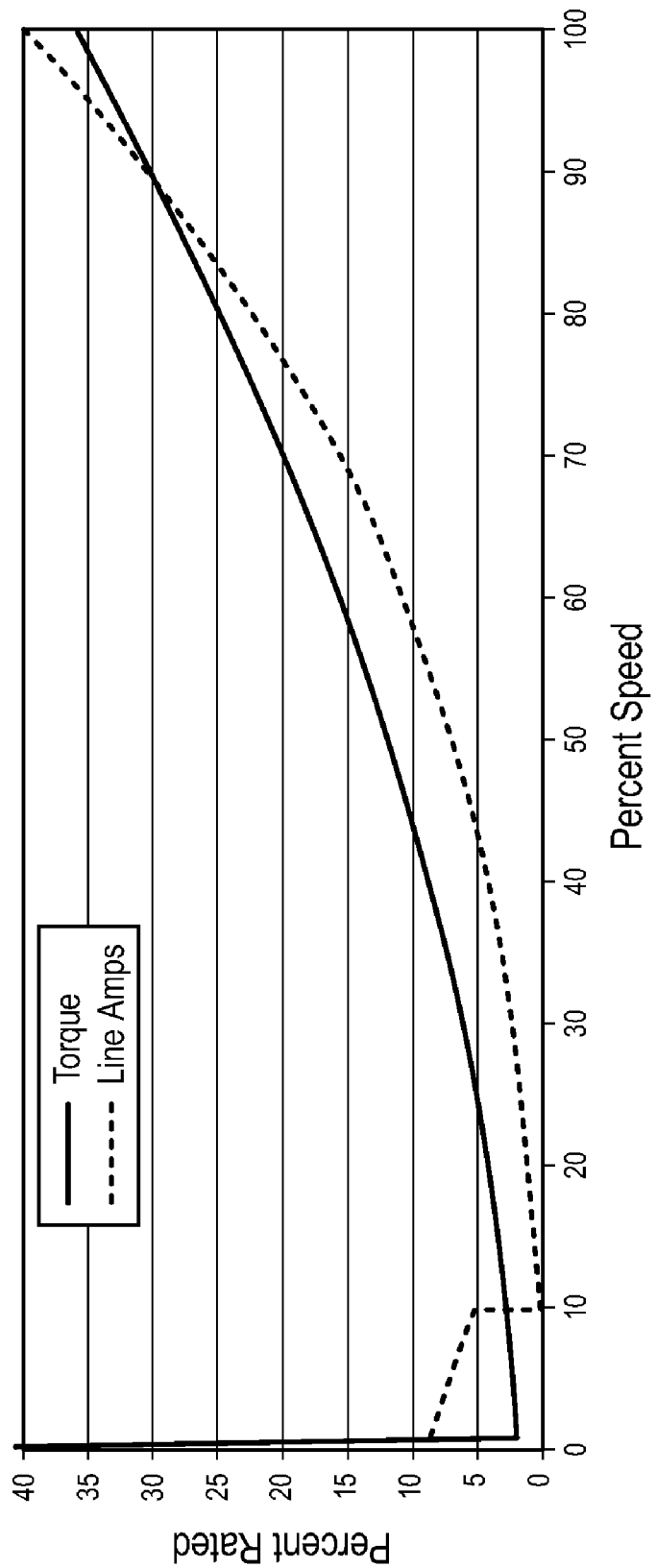
FIG. 5 is a graphical illustration of the torque and power requirements relative to the speed of the motor of the starter of the present invention.

FIG. 5 is a graphical illustration showing the ability of the present invention to overcome the power requirement problems associated with the prior art. The starter 20 of the present invention provides suitable power so as to break the stiction and to minimize inrush current. The present invention offers more than a twenty-fold reduction in the current requirements for the starting of the motor. An excess of 60% torque is available at breakaway. This requires less than 10% of the current at starting. This increases to about 30% at 60 Hz speed. Once the motor is at full speed, it is bumplessly switched to the utility line. This is closed transition switching. The starter 20 of the present invention can be used to start most unloaded compressors with medium voltage induction motors up to about ten thousand horsepower.

Figure 7:
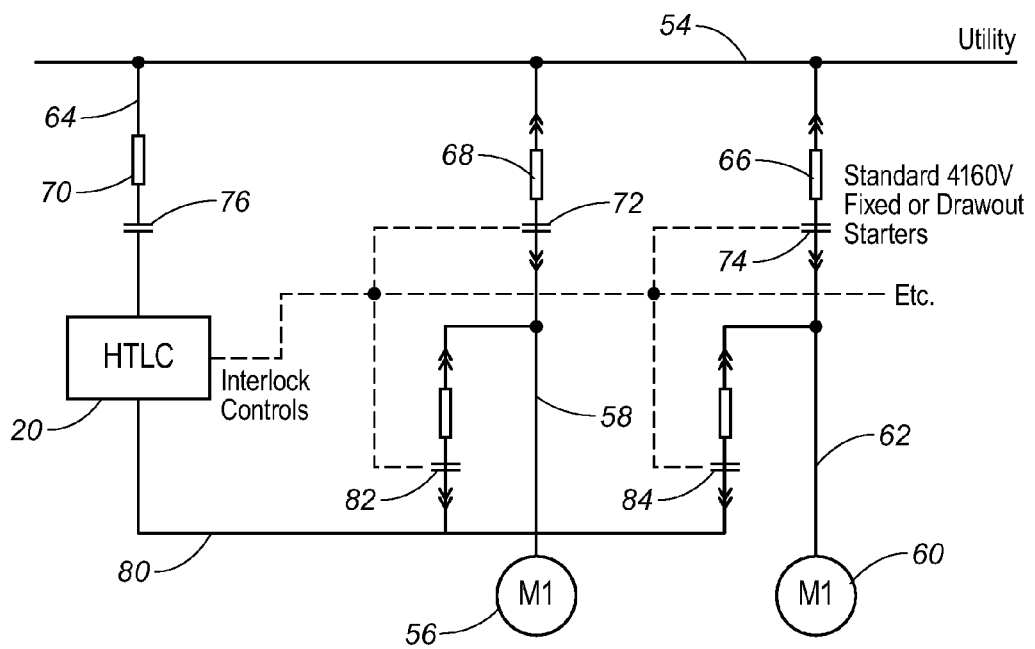
FIG. 7 is a schematic illustration of the soft starter system of the present invention.

FIG. 7 illustrates how the starter 20 of the present invention can be used, as a single unit, so as to be sequenced to start multiple compressor motors off of a common bus 54. As can be seen, a first motor 56 is connected along line 58 to the bus 54. A second motor 60 is connected along line 62 to the bus 54. The starter 20 is also connected along a line 64 to the bus 54. The bus 54 is associated with a utility power supply but can also be associated with a line extending from a generator, in those cases where the generator is used as a power supply. Respective fuses 66, 68 and 70 are provided along lines 62, 58 and 64. Line 58 has a switch 72. Line 62 includes a switch 74.

Line 64 includes a switch 76. The switches 72, 74 and 76 are suitably connected to the control system 52 for the operation of the present invention in a convenient, simple and efficient manner.

The starter 20 is connected along line 80 to the line 58 and to the line 62. Switch 82 is electrically connected along line 80 to the controller. As such, switches 72 and 82 effect the control of motor 56. Another switch 84 is connected along line 80 to the line 62 associated with the second motor 60. As such, switches 84 and 74 control the operation of the motor 60.

In normal use, motors 56 and 60 will be at rest. Switches 72 and 74 are open so that no power is supplied to the motor 56. Similarly, switches 74 and 84 open so that no power is supplied to motor 60. In order to start the first motor 56, switch 82 is closed so that the power from the starter 20 can be delivered along line 80 and line 58 to the motor 56. No power is received from the utility line 54 when switch 72 is open. Control system 52 is connected to the switches 72, 74, 82 and 84 in the manner illustrated by the broken line illustrations of FIG. 7. After motor 56 reaches its desired speed, switch 72 is closed so that all power to the motor 56 is supplied by the utility line 54. Simultaneously, switch 82 is opened.

In order to start the second motor 60, switch 84 is closed so that the power from the starter 20 is transferred along line 62 to the motor 60. After motor 60 reaches its desired speed and frequency, switch 74 is closed so that power from the utility line 54 is supplied to the motor 60. Switch 84 is simultaneously opened. In this manner, both motors 56 and 60 have been started and have been running from the power supplied by the utility. No power is required from the utility directly for the starting of the motors 56 and 60. Various other motors can be connected with the system of the present invention in the manner illustrated in FIG. 6. It is believed that up to twelve starts per hour can be achieved through the system of the present invention. As such, the present invention can be utilized so as to start multiple compressors off of the common bus 54.

Figure 8:
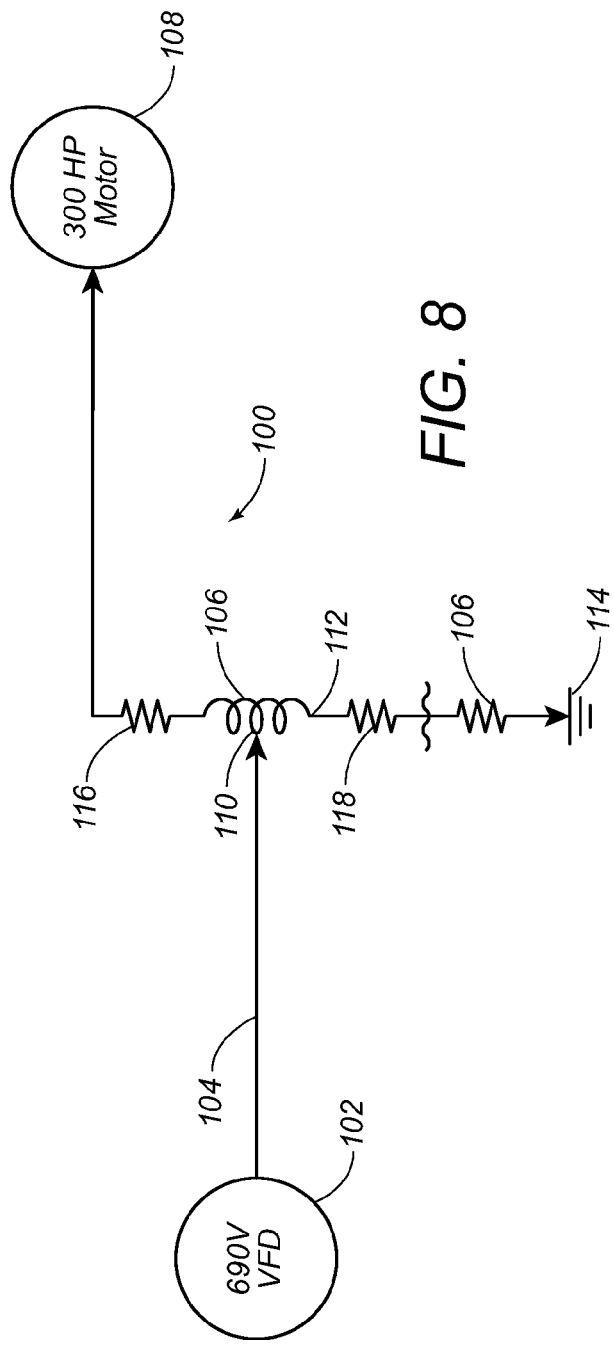
FIG. 8 is a schematic illustration of a simplified embodiment of the present invention.

FIG. 8 illustrates a simplified form of the starter system 100 of the present invention. In starter system 100, the variable frequency drive 102 is connected along line 104 to an autotransformer 106. The upper tap off the autotransformer 106 is connected to the motor 108. Line 104 is connected to autotransformer 106 and tap 110. The neutral 112 of the autotransformer 106 is connected to ground 114.

In the embodiment of the system 100, the motor frequency is reduced to zero Hz. When driven to saturation, by zero frequency, the inductive voltage collapses to zero voltage. At these conditions, the autotransformer becomes a current divider depending on resistance only. The coil resistance is 231 mOhm at upper resistor 116 and 6.6 mOhm at resistor 118. An external resistance at resistor 120 of 100 mOhm is added in the neutral circuit. As can be seen, the ratio of the variable frequency drive current to motor current is approximately 3.8. This can be changed by external resistance. As such, effectively high motor current is possible at zero frequency. This would not be possible with a conventional transformer.

As the frequency increases, the core of the autotransformer 106 begins to support voltage. The voltage polarity is actually inverted so as to cause less terminal voltage at the motor and more at the neutral. The current from the variable frequency drive increases to supply this energy, but the autotransformer is mostly saturated. As such, good conditions are achieved for high motor breakaway torque with low VFD current. As the frequency continues to increase, the neutral voltage and current also increase. At some point, the current ratio meets the turns ratio. As such, the transformer core will begin linear operation. If the motor torque is less (which is likely if the load is turning at a very low speed), the motor current and, therefore, the neutral current will reduce. The autotransformer is properly operating. However, the output voltage is reduced due to losses. As the frequency and speed increase further, it is possible to short the external resistor 120. This removes the lossy component and forces the autotransformer 106 to boost the voltage. Once again, there is a risk of core saturation. The switch point cannot be a very low frequency. The variable frequency drive 102 must adapt to a much lower voltage.

Figure 9:
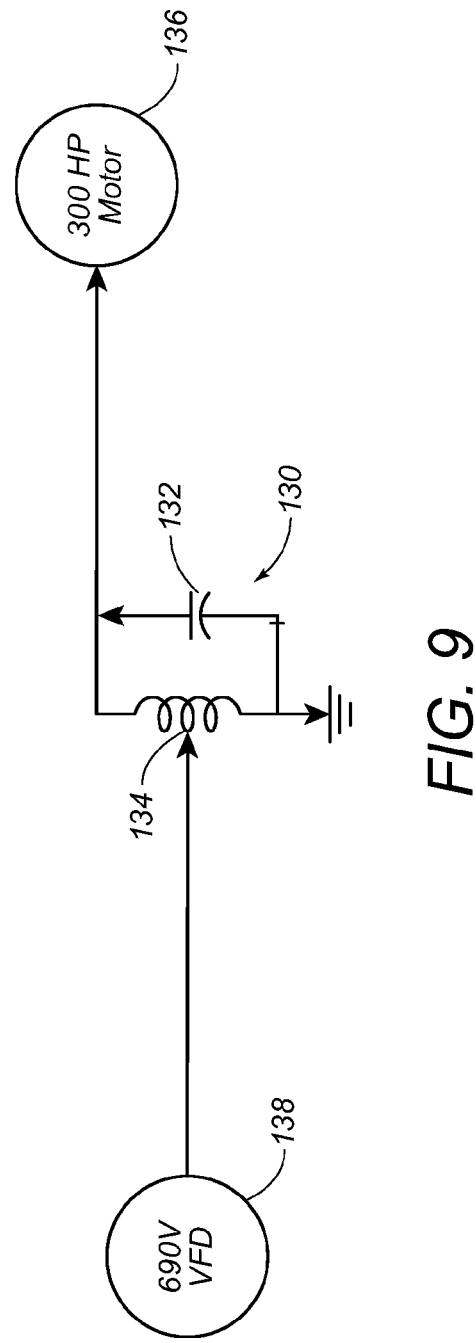
FIG. 9 is a schematic illustration of the preferred embodiment of the present invention.

FIG. 9 shows the system 130 of the preferred embodiment of the present invention in which the capacitor 132 is added to the autotransformer 134. The resistors 116, 118 and 120 have been removed since the resistance of these resistors 116, 118 and 120 is not very important at other than very low frequencies. The capacitor 132 becomes very important. In FIG. 9, the system 130 has increased to a maximum speed. The capacitor 132 has two important effects. First, capacitor 132 filters the PWM voltage and second, the capacitor 132 provides motor PF correction. The capacitor compensates both the motor 136 and the transformer 134 so as to result in minimum current from the variable frequency drive 138 and voltage loss across the autotransformer 134. The autotransformer 134 with the neutral resistor provides the method of operation down to zero frequency so as to allow the low voltage variable frequency drive 138 to provide good breakaway torque for a medium voltage motor. As such, the present invention avoids the need for a clutch, a special motor, or high supply currents.

The present invention eliminates the concern of the doubling of the peak voltage at the motor terminals by providing a sinusoidal filter comprised of a parallel capacitor and the self-inductance of the transformer. No other inductive component is added. This capacitance has the added benefit of providing reactive VARS. This compensates both the motor and the transformer. The restricted low frequency performance and low breakaway motor torque of the problem of the prior art is solved in the present invention by installing a modified autotransformer instead of an isolation transformer. At low frequency, the autotransformer simplifies to a current divider (based on resistance of coils, not turns ratio). To force the current into the motor, resistance is added in the neutral conductor so as to allow for transformer saturation. As frequency increases, the flux reduces and transformer action returns (voltage and current being proportional to turns ratio). At a higher frequency, the resistance is shorted to minimize the voltage drop.

As such, the system of the present invention boosts motor current and voltage so as to provide high starting torque at low frequency through the use of the autotransformer. Transformer saturation is permitted as neutral resistance limits the current. Once the motor is turning at a few percent speed, the neutral resistance is removed and the non-saturated transformer action resumes. The output capacitor provides PF correction for the load and, in combination with the autotransformer series impedance, provides a filter. The variable frequency drive PWM waveform is completely filtered so as to provide sinusoidal voltage and current to the connected motor.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A soft start system comprising:
   a motor;
   a power supply means for passing power of a first voltage and a first current and a first frequency;
   a variable frequency drive connected to said power supply; and
   an autotransformer means connected between said variable frequency drive and said motor for passing power of a second voltage and a second current and a second frequency to said motor, said second voltage and said second frequency being less than said first voltage and said first frequency, said second current being higher than said first current.

2. The system of claim 1, said motor being an AC motor.

3. The system of claim 2, said motor being a compressor motor of a horsepower of up to ten thousand horsepower.

4. The system of claim 1, said motor being connected by a first line to said power supply, said system further comprising:
   a switching means connected to said first line between said motor and said power supply, said switching means for closing when said motor reaches a frequency matching said first frequency.

5. The system of claim 4, further comprising:
   a sensing means cooperative with said motor for sensing a frequency of power passing to said motor, said switching means interactive with said sensor means so as to close said switching means when said frequency matches said first frequency.

6. The system of claim 1, further comprising:
   a first motor connected by a second line to said autotransformer means; and
   a second motor, said switching means for opening when said autotransformer means passes power to said first motor so as to start said motor, said switching means for opening said second line when said first motor reaches said frequency.

7. The system of claim 6, said second motor connected by a third line to a power supply, said second motor connected by a fourth line to said autotransformer means, said switching means comprising a first switch on said third line and a second switch on said fourth line, said second switch closing when said first motor reaches said frequency, said first switch closing when said second motor reaches said frequency.

8. The system of claim 1, said autotransformer means comprising:
   a single core; and
   a winding extending over said single core, said winding being connected to said motor and to said variable frequency drive.

9. The system of claim 8, said autotransformer means further comprising:
   a filter connected in parallel to said winding, said winding having a first terminal connected to said variable frequency drive and a second terminal connected to said motor, said winding having a grounded neutral.

10. The system of claim 9, said filter means comprising:
    a capacitor connected in parallel to said motor.

11. The system of claim 1, further comprising:
    a transforming means connected between said power supply and said variable frequency drive, said transforming means for decreasing said first voltage to said variable frequency drive.

12. A process for starting a motor from a power supply comprising:
    passing power from the power supply of a first frequency and a first voltage and a first current to a variable frequency drive;
    passing the power from the variable frequency drive to an autotransformer;
    autotransforming the power by said autotransformer such that the power is of a second frequency that is less than said first frequency and a second voltage that is less than said first voltage and a second current that is higher than a first current; and
    passing the autotransformed power to said motor so as to start the motor.

13. The process of claim 12, further comprising:
    connecting the motors to said power supply when a frequency of the motor matches said first frequency.

14. The process of claim 13, further comprising:
    disconnecting the motor from the autotransformed power generally simultaneously with the step of connecting.

15. The process of claim 12, further comprising:
    transforming the power from the power supply so as to decrease said first voltage to said variable frequency drive.

16. The process of claim 12, further comprising:
    filtering the power from the variable frequency drive so as to impede high frequency harmonics of the power from the variable frequency drive.

17. The process of claim 12, the motor being a compressor motor of having horsepower of up to ten thousand horsepower, said power supply being a utility power supply.

* * * * *